(12) United States Patent
Brock et al.

(10) Patent No.: US 8,689,336 B2
(45) Date of Patent: Apr. 1, 2014

(54) TIERED EXPOSURE MODEL FOR EVENT CORRELATION

(75) Inventors: Thomas Brock, Carrollton, TX (US); Nelson Chevis, Highland Village, TX (US); Trish Harris, Desoto, TX (US); Mau Q. Le, Tustin, CA (US)

(73) Assignee: Bank of America Corporation, Charlotte, NC (US)

( * ) Notice: Subject to any disclaimer, the term of this patent is extended or adjusted under 35 U.S.C. 154(b) by 376 days.

(21) Appl. No.: 12/891,229

(22) Filed: Sep. 27, 2010

(65) Prior Publication Data

US 2012/0079598 A1 Mar. 29, 2012

(51) Int. Cl.
*G06F 11/00* (2006.01)

(52) U.S. Cl.
USPC ............... 726/25; 726/13; 726/26; 713/152; 713/187

(58) Field of Classification Search
None
See application file for complete search history.

(56) References Cited

U.S. PATENT DOCUMENTS

| 2006/0191012 A1* | 8/2006 | Banzhof et al. ............... 726/25 |
| 2010/0083382 A1* | 4/2010 | Farley et al. .................. 726/24 |
| 2010/0242114 A1* | 9/2010 | Bunker et al. ................. 726/25 |

* cited by examiner

*Primary Examiner* — Shewaye Gelagay
(74) *Attorney, Agent, or Firm* — Michael A. Springs; Moore and Van Allen, PLLC; Patrick B. Horne

(57) ABSTRACT

A method for real-time threat monitoring includes identifying two or more real time vulnerabilities, each associated with one or more objects of an enterprise, correlating the two or more real-time vulnerabilities to each other, applying an exposure tiering model to the correlated real-time vulnerability, thereby classifying the correlated real-time vulnerability into risk tiers, and initiating an alert based on the correlated real-time vulnerability and the exposure tiers into which the correlated real-time vulnerability is classified. According to other embodiments a method includes applying an exposure methodology to log data contained in one or more object logs thereby identifying one or more security events, applying an exposure tiering model to the one or more security events, thereby classifying the security events into exposure tiers, and initiating an alert based on the security events and the exposure tiers into which the security events are classified.

57 Claims, 7 Drawing Sheets

TIERED EXPOSURE MODEL FOR EVENT CORRELATION

FIELD

In general, embodiments of the invention relate to identifying threats to an enterprise. More specifically, embodiments of the invention relate real-time threat monitoring, identification, classification and remediation.

BACKGROUND

Some programmers are constantly creating new threats such as by circumventing traditional network firewalls and intrusion detection systems. Further, such programmers appear to be attacking web applications directly through encrypted secure socket layer (SSL) sessions. Such attacks to websites and/or web applications, of course, can negatively affect business reputation, regulatory compliance, and continuity. The cost of web application security breaches can be very high and in some cases incalculable as breaches can reach across enterprises through every line of business, even affecting enterprise-customer relationships in some instances.

In some enterprises, preventative vulnerability assessments are conducted periodically, such as annually, on any applications determined high exposure for breach. Such proactive measures are designed to identify particular vulnerabilities. However, other security breaches may be occurring on a much higher frequency and may not be detected absent more frequent monitoring.

Hence, a system for real-time threat monitoring, analysis and remediation is needed.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, and computer program products, for real-time threat monitoring.

According to embodiments of the invention, a method includes identifying, by a processing device, two or more real time vulnerabilities, each associated with one or more objects of an enterprise, correlating, by the processing device, the two or more real-time vulnerabilities to each other, thereby resulting in a correlated real-time vulnerability, applying, by the processing device, a exposure tiering model to the correlated real-time vulnerability, thereby classifying the correlated real-time vulnerability into one or more of a plurality of exposure tiers, and initiating, by the processing device, an alert based at least in part on the correlated real-time vulnerability and the one or more exposure tiers into which the correlated real-time vulnerability is classified. In some embodiments, the one or more objects of the enterprise comprise one or more applications of the enterprise. In some embodiments, the one or more objects of the enterprise comprise one or more computing systems of the enterprise. In some such embodiments, the one or more computing systems comprise one or more servers. In some embodiments of the method, the one or more objects of the enterprise comprise one or more databases of the enterprise. In some embodiments, the method also includes initiating, by the processing device, remediation of at least one of the two or more vulnerabilities based at least in part on the correlated real-time vulnerability and the one or more exposure tiers into which the correlated real-time vulnerability is classified.

In some embodiments, the method also includes determining, by the processing device, one or more additional objects of the enterprise corresponding with the correlated real-time vulnerability; and initiating, by the processing device, one or more additional alerts based at least in part on the correlated real-time vulnerability and the one or more exposure tiers into which the correlated real-time vulnerability is classified. In some such embodiments, the method also includes initiating, by the processing device, remediation of at least one of the two or more vulnerabilities with regard to the one or more objects based at least in part on the correlated real-time vulnerability and the one or more exposure tiers into which the correlated real-time vulnerability is classified. In other such embodiments, the method also includes initiating, by the processing device, remediation of at least one of the two or more vulnerabilities with regard to the one or more additional objects based at least in part on the correlated real-time vulnerability and the one or more exposure tiers into which the correlated real-time vulnerability is classified.

According to embodiments of the present invention, a system for real-time threat monitoring includes a processing device configured for identifying two or more real time vulnerabilities, each associated with one or more objects of an enterprise, correlating the two or more real-time vulnerabilities to each other, thereby resulting in a correlated real-time vulnerability, applying an exposure tiering model to the correlated real-time vulnerability, thereby classifying the correlated real-time vulnerability into one or more of a plurality of exposure tiers, and initiating an alert based at least in part on the correlated real-time vulnerability and the one or more exposure tiers into which the correlated real-time vulnerability is classified.

In some embodiments, the one or more objects of the enterprise comprise one or more applications of the enterprise. In some embodiments, the one or more objects of the enterprise comprise one or more computing systems of the enterprise. In some embodiments, the one or more computing systems comprise one or more servers. In some embodiments, the one or more objects of the enterprise comprise one or more databases of the enterprise. In some embodiments, the processing device is further configured for initiating remediation of at least one of the two or more vulnerabilities based at least in part on the correlated real-time vulnerability and the one or more exposure tiers into which the correlated real-time vulnerability is classified.

In some embodiments, the processing device is further configured for determining one or more additional objects of the enterprise corresponding with the correlated real-time vulnerability and initiating one or more additional alerts based at least in part on the correlated real-time vulnerability and the one or more exposure tiers into which the correlated real-time vulnerability is classified. In some such embodiments, the processing device is further configured for initiating remediation of at least one of the two or more vulnerabilities with regard to the one or more objects based at least in part on the correlated real-time vulnerability and the one or more exposure tiers into which the correlated real-time vulnerability is classified. In other such embodiments, the processing device is further configured for initiating remediation of at least one of the two or more vulnerabilities with regard to the one or more additional objects based at least in part on the correlated real-time vulnerability and the one or more exposure tiers into which the correlated real-time vulnerability is classified.

According to embodiments of the present invention, a computer program product includes a non-transitory computer-readable memory comprising computer-readable instructions for real-time threat monitoring. The instructions include instructions for identifying two or more real time vulnerabilities, each associated with one or more objects of an enterprise, instructions for correlating the two or more real-time vulnerabilities to each other, thereby resulting in a correlated real-time vulnerability, instructions for applying a exposure tiering model to the correlated real-time vulnerability, thereby classifying the correlated real-time vulnerability into one or more of a plurality of exposure tiers, and instructions for initiating an alert based at least in part on the correlated real-time vulnerability and the one or more exposure tiers into which the correlated real-time vulnerability is classified. In some embodiments, the one or more objects of the enterprise comprise one or more applications of the enterprise.

In some embodiments, the one or more objects of the enterprise comprise one or more computing systems of the enterprise. In some such embodiments, the one or more computing systems comprise one or more servers.

In some embodiments, the one or more objects of the enterprise comprise one or more databases of the enterprise. In some embodiments, the instructions further comprise instructions for initiating remediation of at least one of the two or more vulnerabilities based at least in part on the correlated real-time vulnerability and the one or more exposure tiers into which the correlated real-time vulnerability is classified.

In some embodiments, the instructions further comprise instructions for determining one or more additional objects of the enterprise corresponding with the correlated real-time vulnerability; and instructions for initiating one or more additional alerts based at least in part on the correlated real-time vulnerability and the one or more exposure tiers into which the correlated real-time vulnerability is classified. In some such embodiments, the instructions further comprise instructions for initiating remediation of at least one of the two or more vulnerabilities with regard to the one or more objects based at least in part on the correlated real-time vulnerability and the one or more exposure tiers into which the correlated real-time vulnerability is classified.

In some embodiments, the instructions further comprise instructions for initiating remediation of at least one of the two or more vulnerabilities with regard to the one or more additional objects based at least in part on the correlated real-time vulnerability and the one or more exposure tiers into which the correlated real-time vulnerability is classified.

According to embodiments of the present invention, a method for real-time threat monitoring includes applying, by a processing device, a exposure methodology to log data thereby identifying one or more security events, the log data contained in one or more object logs; applying, by the processing device, a exposure tiering model to the one or more security events, thereby classifying the one or more security events into one or more of a plurality of exposure tiers; and initiating, by the processing device, an alert based at least in part on the one or more security events and the one or more exposure tiers into which the one or more security events is classified. In some embodiments, applying a exposure methodology to log data thereby identifying one or more security events includes correlating, by the processing device, two or more portions of the log data each corresponding to at least one of the security events.

In some embodiments, applying a exposure methodology to log data thereby identifying one or more security events includes applying, by the processing device, one or more controls to the log data. In some such embodiments, applying a exposure methodology to log data thereby identifying one or more security events further comprises analyzing, by the processing device, one or more outputs from the one or more controls applied to the log data in order to identify one or more security events. In some such embodiments, analyzing comprises correlating, by the processing device, two or more outputs from the controls to identify one or more security events. In other such embodiments, analyzing comprises correlating, by the processing device, two or more portions of log data based at least in part on the one or more outputs from the one or more controls applied to the log data, the correlating to identify one or more security events.

In some embodiments, the one or more object logs comprise one or more application logs corresponding to one or more applications of an enterprise. In some embodiments, the one or more object logs comprise one or more computing system logs of an enterprise. In some embodiments, the one or more object logs comprise one or more databases of an enterprise. In some embodiments, the method also includes initiating, by the processing device, remediation of one or more of the security events based at least in part on the correlated log data and the one or more exposure tiers into which the correlated log data is classified.

According to embodiments of the present invention, a system for real-time threat monitoring, the system includes a processing device configured for applying a exposure methodology to log data thereby identifying one or more security events, the log data contained in one or more object logs; applying a exposure tiering model to the one or more security events, thereby classifying the one or more security events into one or more of a plurality of exposure tiers; and initiating an alert based at least in part on the one or more security events and the one or more exposure tiers into which the one or more security events is classified.

In some embodiments, the processing device, configured for applying a exposure methodology to log data thereby identifying one or more security events comprising correlating two or more portions of the log data each corresponding to at least one of the security events.

In some embodiments, the processing device is configured for applying a exposure methodology to log data thereby identifying one or more security events comprising applying one or more controls to the log data. In some such embodiments, the processing device is configured for applying a exposure methodology to log data thereby identifying one or more security events further comprising analyzing one or more outputs from the one or more controls applied to the log data in order to identify one or more security events. In some such embodiments, the processing device is configured for analyzing comprising correlating two or more outputs from the controls to identify one or more security events.

In some embodiments, the processing device is configured for analyzing comprising correlating two or more portions of log data based at least in part on the one or more outputs from the one or more controls applied to the log data, the correlating to identify one or more security events.

In some embodiments, the one or more object logs comprise one or more application logs corresponding to one or more applications of an enterprise. In some embodiments, the one or more object logs comprise one or more computing system logs of an enterprise. In some embodiments, the one or more object logs comprise one or more databases of an enterprise. In some embodiments, the processing device is further configured for initiating remediation of one or more of the security events based at least in part on the correlated log data and the one or more exposure tiers into which the correlated log data is classified.

According to embodiments of the present invention, a computer program product includes a non-transient computer-readable memory comprising computer-readable instructions for real-time threat monitoring. The instructions includes instructions for applying an exposure methodology to log data thereby identifying one or more security events, the log data contained in one or more object logs; instructions for applying an exposure tiering model to the one or more security events, thereby classifying the one or more security events into one or more of a plurality of exposure tiers; and instructions for initiating an alert based at least in part on the one or more security events and the one or more exposure tiers into which the one or more security events is classified. In some embodiments, the instructions for applying an exposure methodology to log data thereby identifying one or more security events include instructions for correlating two or more portions of the log data each corresponding to at least one of the security events.

In some embodiments, the instructions for applying an exposure methodology to log data thereby identifying one or more security events comprise instructions for applying one or more controls to the log data. In some such embodiments, the instructions for applying an exposure methodology to log data thereby identifying one or more security events further comprise instructions for analyzing one or more outputs from the one or more controls applied to the log data in order to identify one or more security events. In some such embodiments, the instructions for analyzing comprise instructions for correlating two or more outputs from the controls to identify one or more security events. In other such embodiments, the instructions for analyzing comprise instructions for correlating two or more portions of log data based at least in part on the one or more outputs from the one or more controls applied to the log data, the correlating to identify one or more security events.

In some embodiments, the one or more object logs comprise one or more application logs corresponding to one or more applications of an enterprise. In some embodiments, the one or more object logs comprise one or more computing system logs of an enterprise. In some embodiments, the one or more object logs comprise one or more databases of an enterprise. In some embodiments, the instructions further comprise instructions for initiating remediation of one or more of the security events based at least in part on the correlated log data and the one or more exposure tiers into which the correlated log data is classified.

BRIEF DESCRIPTION OF THE DRAWINGS

Figure 1:
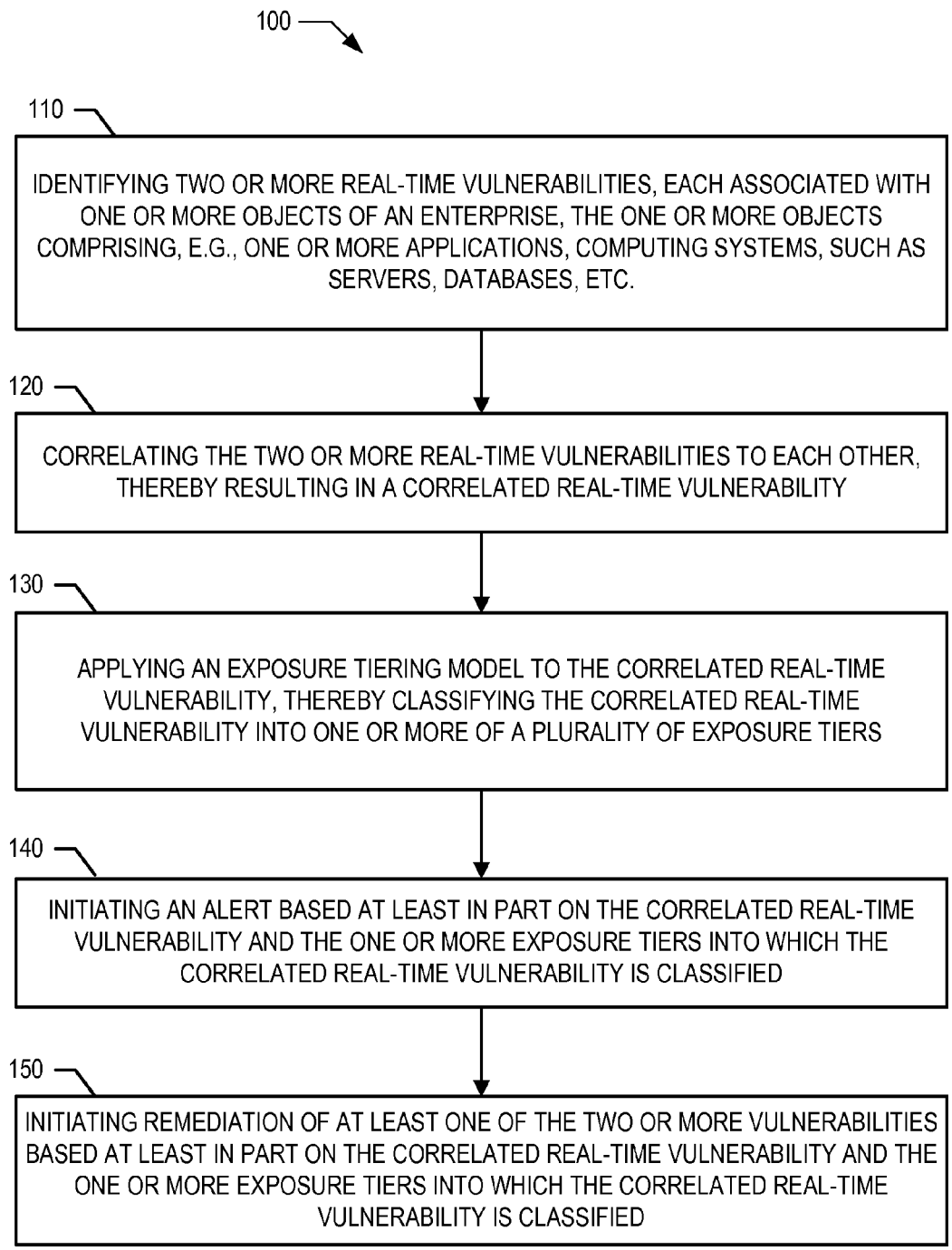
Figure 2:
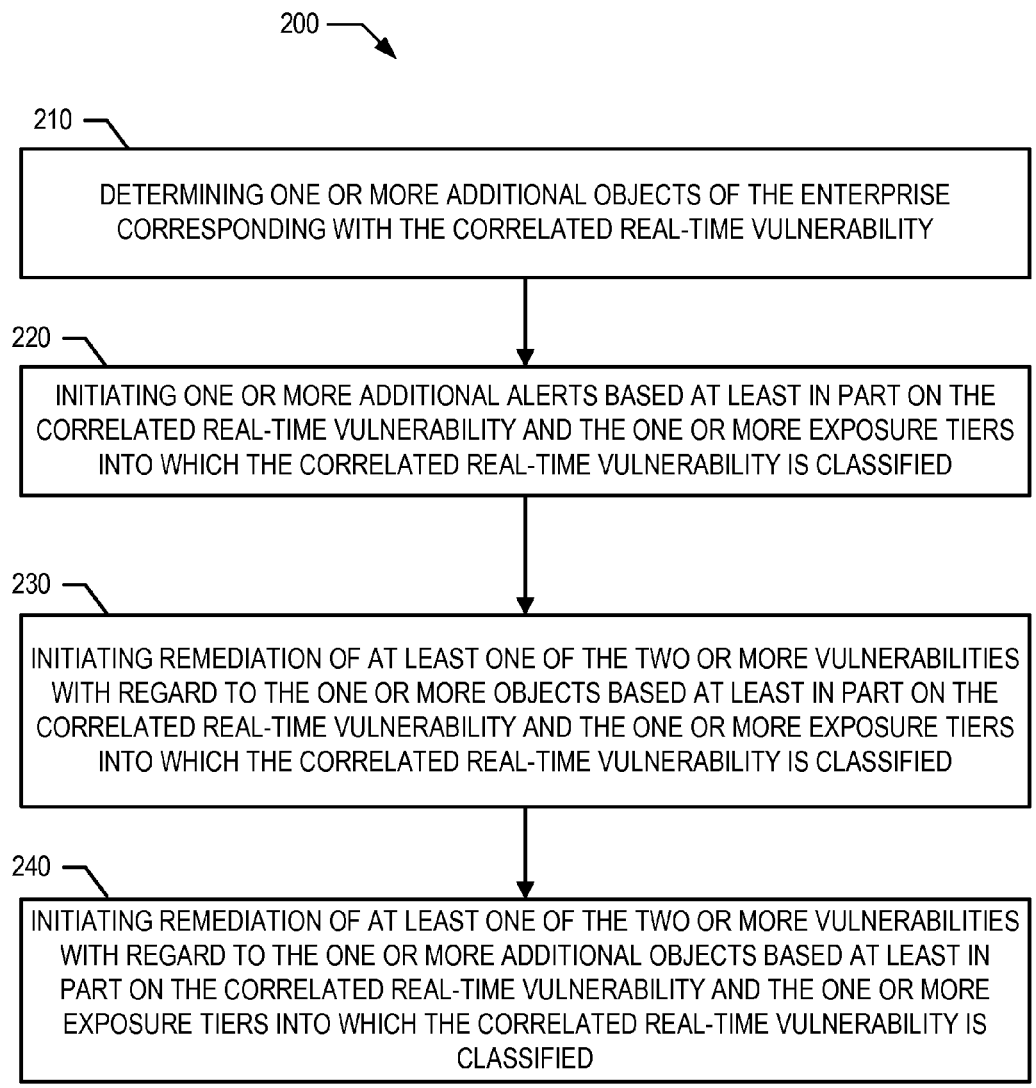
Figure 3:
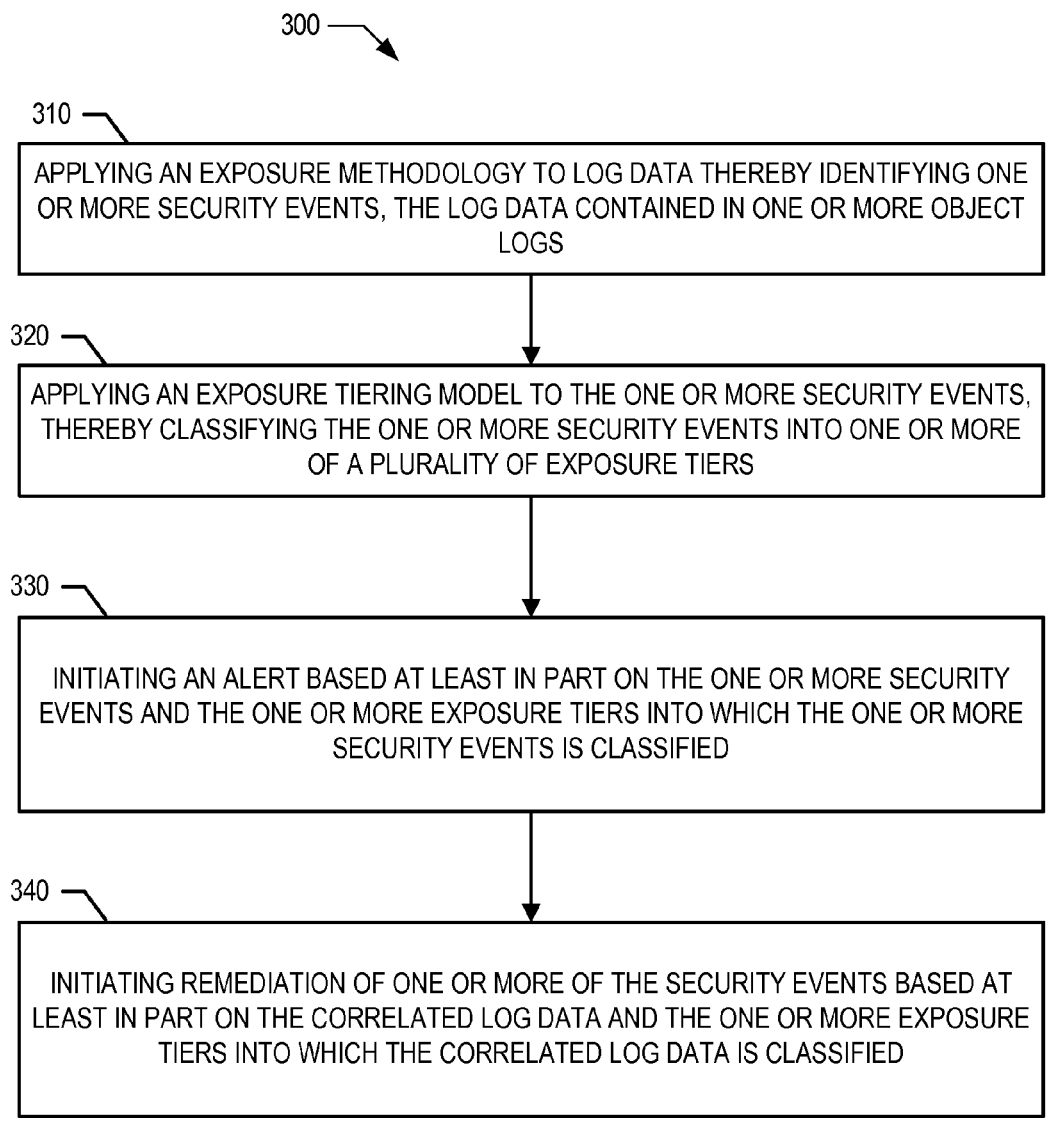
Figure 4:
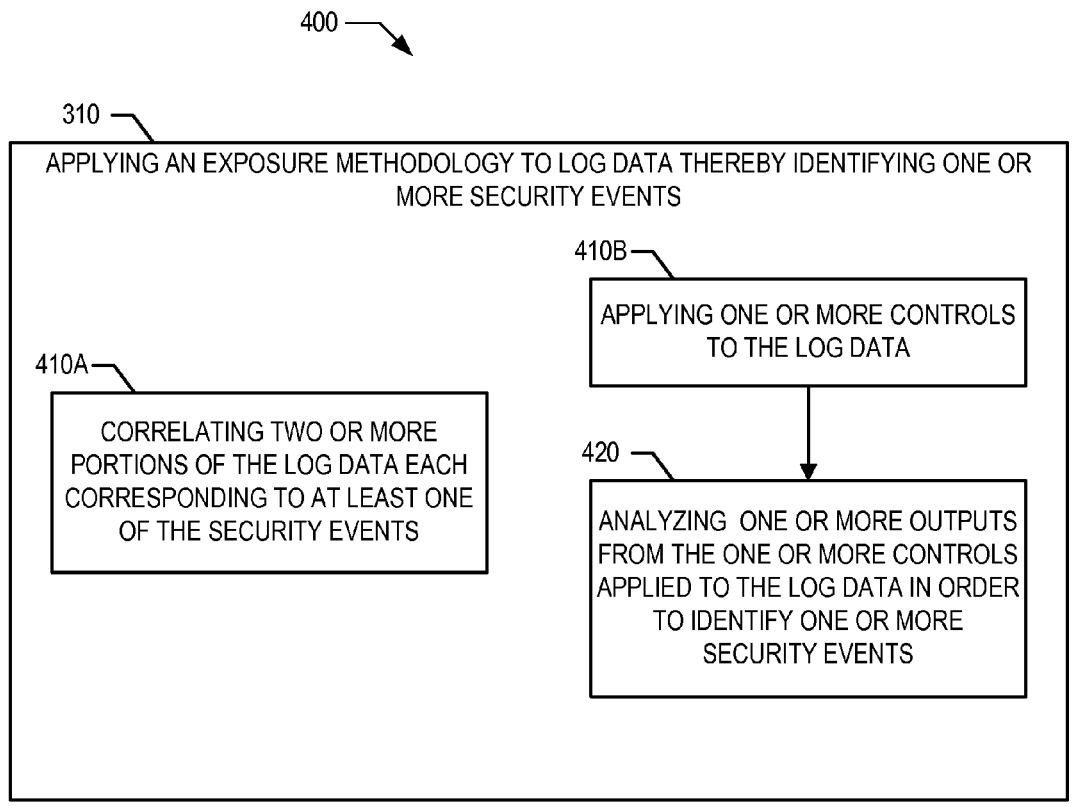
Figure 5:
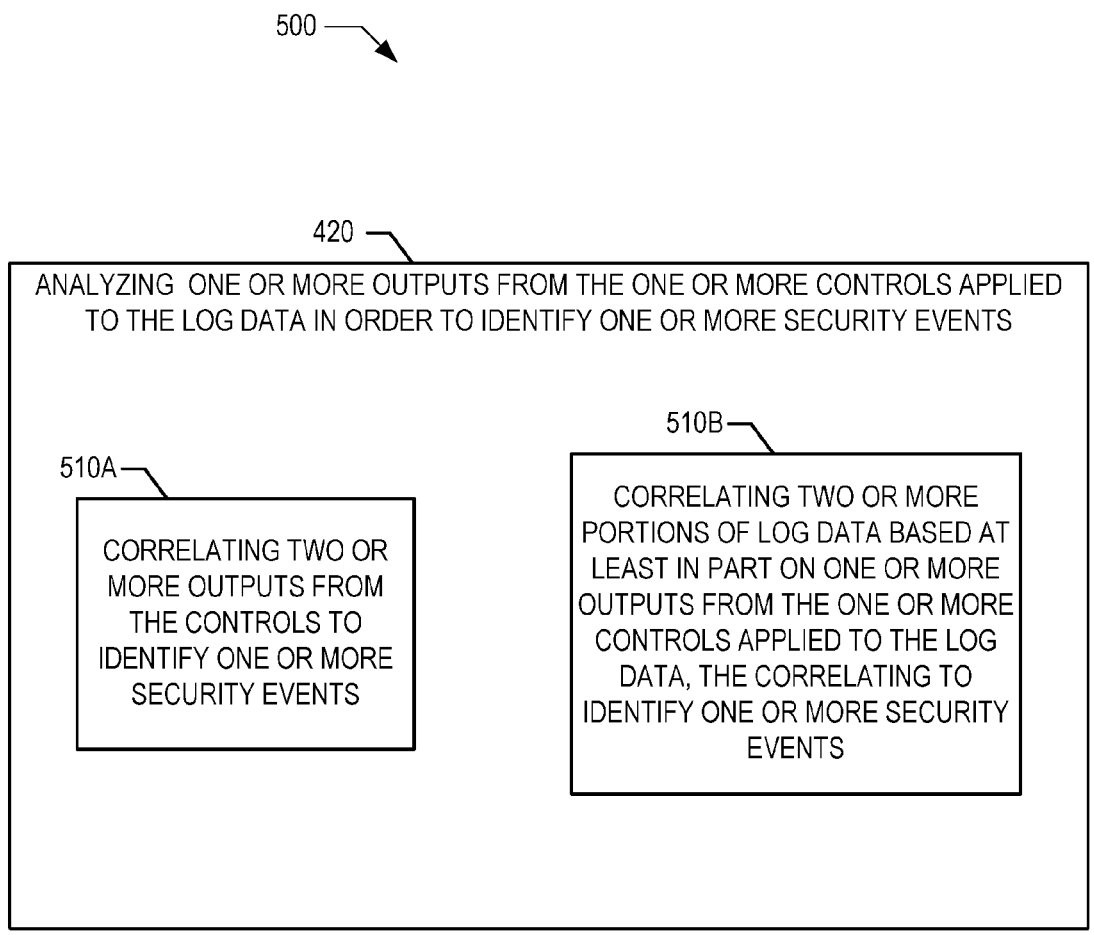
Figure 6:
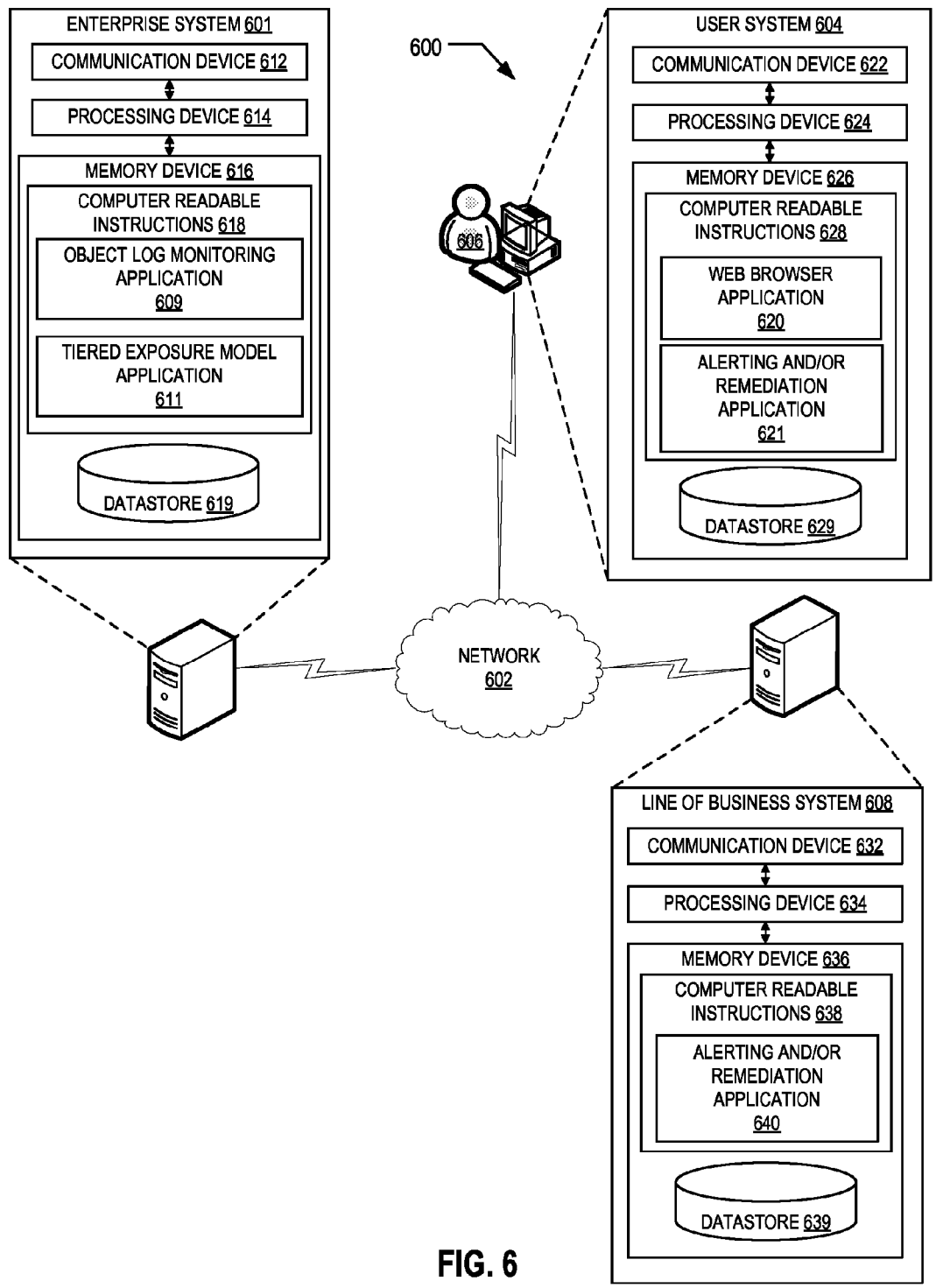
Figure 7:
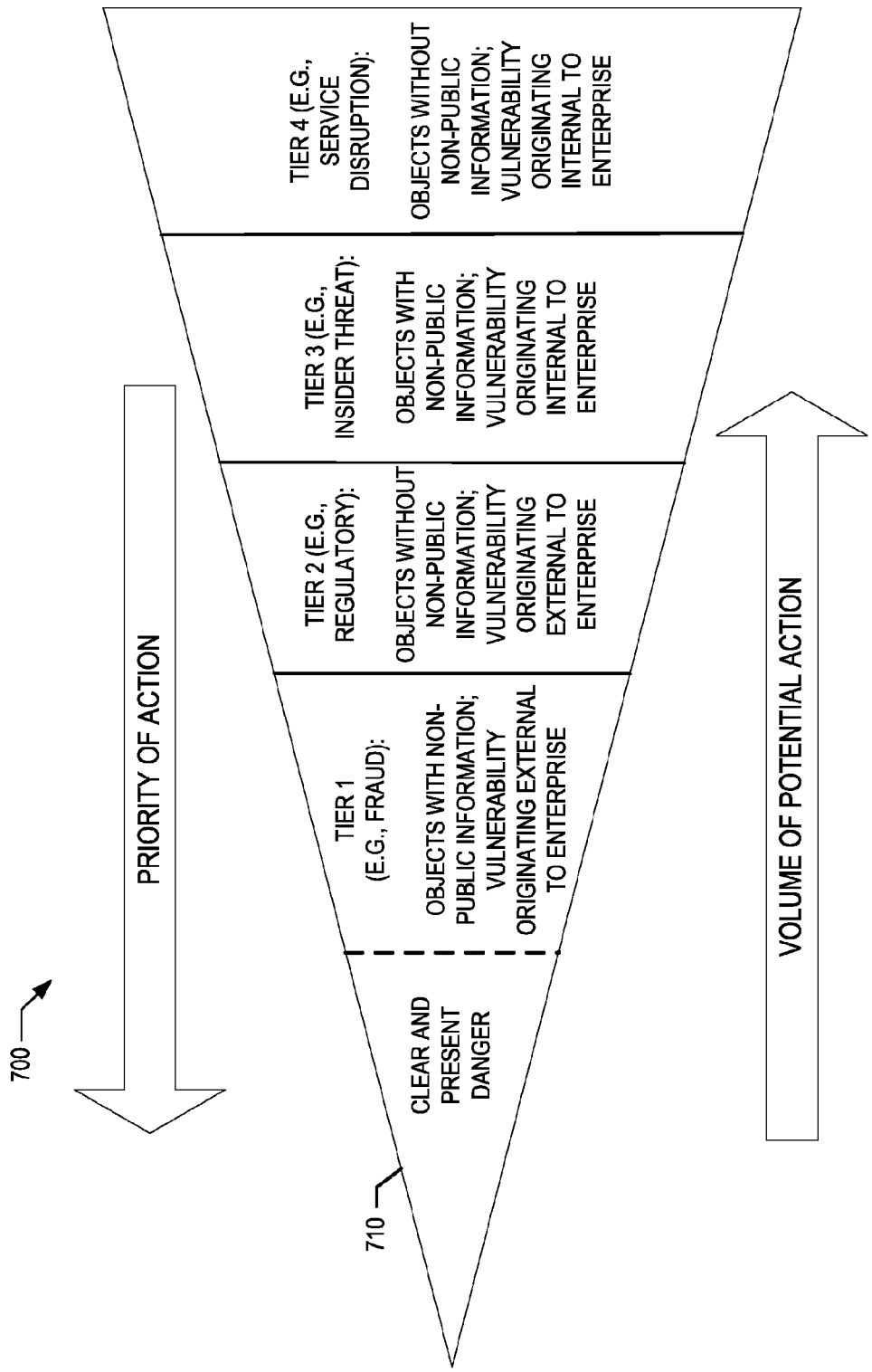

Having thus described embodiments of the invention in general terms, reference will now be made to the accompanying drawings, wherein:

FIG. 1 is a flowchart illustrating a method for real-time threat monitoring according to embodiments of the present invention;

FIG. 2 is a flowchart illustrating a method including additional, optional steps of the method of FIG. 1 according to embodiments of the present invention;

FIG. 3 is a flowchart illustrating another method for real-time threat monitoring according to embodiments of the present invention;

FIG. 4 is a flowchart illustrating a method including additional detail regarding the method of FIG. 3;

FIG. 5 is a flowchart illustrating a method including additional detail regarding the method of FIG. 4;

FIG. 6 is a block diagram illustrating an environment in which the present invention operates according to embodiments of the present invention; and FIG. 7 is a combination block diagram and flowchart illustrating an exposure tiering model according to embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the invention provide for systems, methods and computer program products for real-time threat monitoring. In some embodiments, a method includes identifying two or more real time vulnerabilities, each associated with one or more objects of an enterprise, correlating the two or more real-time vulnerabilities to each other, applying a risk tiering model to the correlated real-time vulnerability, thereby classifying the correlated real-time vulnerability into exposure tiers, and initiating an alert based on the correlated real-time vulnerability and the exposure tiers into which the correlated real-time vulnerability is classified. According to other embodiments a method includes applying an exposure methodology to log data contained in one or more object logs thereby identifying one or more security events, applying an exposure tiering model to the one or more security events, thereby classifying the security events into exposure tiers, and initiating an alert based on the security events and the risk tiers into which the security events are classified.

Referring now to FIG. 1, a method 100 for real-time threat monitoring according to embodiments of the present invention is shown. The first step, as represented by block 110, is identifying two or more real-time vulnerabilities, each associated with one or more objects of an enterprise. In various embodiments, the objects are or include one or more applications run by the enterprise, one or more computing systems such as servers, personal computers, mobile devices and the like, one or more databases or the like. In some embodiments, only one real-time vulnerability is identified, and ultimately classified or ranked using the exposure tiering model as discussed further below.

The vulnerabilities, in some embodiments, are identified using one or more controls associated with one or more objects such as, for example, one or more processes, applications, databases, servers, other systems or the like of an enterprise. The controls are typically associated or include metrics for evaluating some aspect of the associated object. Vulnerabilities with regard to the object can include numerous and different types of security breaches. The vulnerabilities, in some embodiments, are identified by applying object log data, such as application log data, to the one or more controls associated with one or more objects. In some embodiments, multiple pieces of log data are identified as representing one or more possible vulnerabilities. In some embodiments, two or more vulnerabilities are identified, such as, for example, by applying one or more controls to one or more pieces of log data related to one or more objects of the enterprise. In one example, multiple pieces of log data regarding one application are analyzed by applying a control, and two potential vulnerabilities are identified based on the applied control. In this example, the two potential vulnerabilities can be analyzed together in order to, ultimately, initiate alert(s) based on the correlated vulnerabilities as well as initiating remediation of the correlated vulnerabilities either as a correlated vulnerability, or in some embodiments, as individual vulnerabilities. In one embodiment, for example, multiple vulnerabilities are identified, correlated, classified, but the vulnerabilities, in some embodiments, are alerted and/or remediated separately due to the vulnerabilities being associated with different objects and/or lines of business within the enterprise, and/or requiring different alerting mechanisms and/or remediation mechanisms.

In another embodiment, for example, multiple pieces of log data from multiple objects are analyzed with relation to a control and multiple potential vulnerabilities are identified based on the analysis. Those multiple potential vulnerabilities, while associated with multiple objects, can be combined in order to assess exposure and ultimately initiate remediation. In yet another example embodiment, multiple pieces of log data from multiple objects are analyzed with relation to multiple controls. From the analysis, multiple potential vulnerabilities are identified, and the system determines, based on a control or some other indication, such as a related method of attack, that the vulnerabilities are related. In such a case, such vulnerabilities can be correlated and remediation can be initiated on the related vulnerabilities simultaneously, in some embodiments, in order to expedite remediation.

Referring back to FIG. 1, the next step, as represented by block 120, in some embodiments, is correlating the two or more real-time vulnerabilities to each others, thereby resulting in a correlated real-time vulnerability. This correlation step is performed by the system, in some embodiments, using one or more controls and/or correlation rules that are predetermined and input into the system in safeguard against one or more threats or potential vulnerabilities regarding one or more objects. Accordingly, vulnerabilities affecting different objects, for example, can be correlated for some other reason, such as, the potential vulnerability to the multiple objects are similar. In one example, multiple vulnerabilities are protected against by correlation rules stored by the system that indicate the system when similar viruses are attacking different security programs on different databases of the enterprise. This example scenario might indicate a broader, more comprehensive attack as opposed to two random, or isolated, incidental attacks.

Accordingly, the correlation rules dictate to the system that the two identified vulnerabilities be correlated, thereby resulting in a correlated real-time vulnerability. In some embodiments, data regarding the multiple vulnerabilities is combined, and in some embodiments, identification information regarding the multiple vulnerabilities is combined. In others, identification information and/or pointer information regarding the multiple vulnerabilities is associated such that the multiple vulnerabilities are correlated. In other embodiments, numerous other methods for correlating multiple vulnerabilities are contemplated, such as, for example, correlating the vulnerabilities based on the one or more controls triggered by the multiple vulnerabilities.

In other embodiments, for example, the multiple vulnerabilities are correlated based on the one or more objects affected by the multiple vulnerabilities. In other embodiments, for example, the multiple vulnerabilities are correlated based on the pieces of information similar between the multiple vulnerabilities thereby indicating to the system, based on correlation rules, for example, that the multiple vulnerabilities should be correlated. In some embodiments, after correlation of multiple vulnerabilities, the system searches for additional, similar vulnerabilities within the enterprise.

In some embodiments, after correlation of multiple vulnerabilities, the system searches for additional objects, lines or business or other areas of the enterprise that may have been or presently is being affected by one or more of the multiple vulnerabilities. In one embodiment, for example, the system determines the correlated real-time vulnerability and/or characteristics of the correlated real-time vulnerability and uses those characteristics to search for additional threats to the enterprise.

The next step, as represented by block 130, is applying an exposure tiering model to the correlated real-time vulnerability, thereby classifying the correlated real-time vulnerability into one or more of a plurality of exposure tiers. The exposure tiers of one embodiment of the exposure tiering model are shown in FIG. 7 and are discussed further below. The exposure tiering model includes, in various embodiments, multiple tiers divided based on pre-determined exposure levels to one or more objects and/or the enterprise in general. In some embodiments, the tiers are divided based at least in part on whether the threat or vulnerability is a threat external to the enterprise or a threat internal to the enterprise. In some embodiments, the tiers are divided based at least in part on whether the one or more objects being threatened has access to non-public information.

The next step, as represented by block 140, is initiating an alert based at least in part on the correlated real-time vulnerability and the one or more exposure tiers into which the correlated real-time vulnerability is classified. The system initiates an alert or multiple alerts based on the correlated real-time vulnerability so that each line of business of an enterprise affected by one of the vulnerabilities is notified of the vulnerability.

For example, in one embodiment, the correlated vulnerability relates to a security threat to an application running on the workstations used by multiple lines of business. In this example, the system identifies the multiple vulnerabilities, that is, the vulnerabilities regarding the multiple instances of the application running on the multiple workstations among the lines of business, correlates the vulnerabilities, such as by identifying the common characteristics of the vulnerabilities, which in this example, may be the application running on the various workstations as a whole, or may be one portion of the application permitting the vulnerability. Then, the system classifies the correlated real-time vulnerability based on the exposure tiering model in order to provide context for the severity of the correlated vulnerability.

For example, in one embodiment, the correlated vulnerability is related to an application having access to non-public information and that is originating external to the enterprise. In some embodiments, such a vulnerability is classified as a "Tier 1" or a highest priority vulnerability. Thus, in initiating the alert to the various affected lines of business, the system specifies the severity of the vulnerability, based on the tier in which it is classified, to the lines of business. For example, in some embodiments, the system alerts the lines of business using one or more methods of communication such as email, automated phone call, initiating manual phone call, instant message, text message, audible alert, visual alert, audio-visual alerts on screen or otherwise and the like.

The next step, as represented by block 150, is initiating remediation of at least one of the two or more vulnerabilities based at least in part on the correlated real-time vulnerability and the one or more exposure tiers into which the correlated real-time vulnerability is classified. In some embodiments, step 150 is not included, and in others, remediation of multiple vulnerabilities is initiated simultaneously or substantially simultaneously. In some embodiments, remediation of multiple vulnerabilities is similar or the same and, therefore, initiating remediation of the multiple vulnerabilities is less complicated than initiating remediation of multiple, unrelated vulnerabilities. In some embodiments, initiating remediation includes providing instructions to the various affected lines of business regarding methods for remediation, either manual or automatic.

For example, in one embodiment, the system initiates an alert to a line of business based on a correlated real-time vulnerability. The alert, in this example, is an electronic alert communicated electronically from a server to the workstations of the line of business. In this example, the server also communicates instructions for a processor of the workstations to remediate the vulnerability. For example, in some embodiments, the server sends instructions for the processors of the workstations to remove a virus or some other software threat to the workstation and thereby the enterprise.

Referring now to FIG. 2, a method 200 including additional, optional steps of method 100 of FIG. 1. The first step, as represented by block 210, is determining one or more additional objects of the enterprise corresponding with the correlated real-time vulnerability. As discussed above, once one or more vulnerabilities are correlated, the system, in some embodiments, searches for additional vulnerabilities within appropriate lines of business and/or within the entire enterprise. In some embodiments, the search is based on common characteristics of the vulnerabilities correlated. In some embodiments, the search is based on more complex determinations. For example, in some instances, the correlated vulnerability may indicate to the system that a separate and distinct vulnerability may be probably. Thus, the system searches the possible lines or business or objects that may be affected by the probable, additional vulnerability or searches the entire enterprise for the probable additional vulnerability. In some embodiments, determining the additional vulnerabilities includes incorporating additional correlation rules within the system such that future potential vulnerabilities can better be identified. For example, in one embodiment, two distinct vulnerabilities are determined to be related based on the timing and method of their coordinated attack on one or more objects of an enterprise. In such a situation, the system is capable of adapting for future detection of potential vulnerabilities. For example, in one embodiment of this feature, the system stores correlation and vulnerability searching rules indicating the relationship between the two, seemingly distinct vulnerabilities. Thus, in application of the new rules, when one of the particular vulnerabilities is detected, the system automatically searches for the other, corresponding vulnerability based on the new searching rules.

The next step, as represented by block 220, is initiating one or more additional alerts based at least in part on the correlated real-time vulnerability and the one or more exposure tiers into which the correlated real-time vulnerability is classified. This step represents initiating additional alerts based on the multiple identified vulnerabilities. For example, a first vulnerability, once identified, would be classified by the exposure tier model as a Tier 1 vulnerability, thereby indicating the vulnerability is a very high exposure. However, a second vulnerability, once identified, would be classified as a Tier 3 vulnerability. Thus, the alerts initiated for the different vulnerabilities individually may be very different in various embodiments. For example, in one embodiment, the alert for the Tier 1 vulnerability may be very noticeable by the recipient in the potentially affected lines of business, whereas the alert initiated by the system for the Tier 3 vulnerability may not be very noticeable in a short period of time. For example, the Tier 3 alert may be an email message sent to the appropriate members of a potentially affected line of business. However, once the Tier 1 vulnerability and the Tier 3 vulnerability are correlated, the system determines that the Tier 3 vulnerability actually enhances the Tier 1 vulnerability's potential threat. Thus, the combination of the vulnerabilities is classified as a Tier 1 vulnerability. In this example, the additional alert initiated by the system with regard to the Tier 3 alert may indicate to the appropriate line of business the serious nature of the correlated real-time vulnerability.

In some embodiments, the additional alert is a second alert sent to the same lines of business and in other embodiments, the additional alert is a second alert sent to additional lines of business as determined to be necessary by the system. For example, in one embodiment, the system determines that additional objects of the enterprise may be affected by the correlated vulnerability, such as in step 210. In this example, the system determines that an additional alert is necessary to inform the one or more lines of business within the enterprise that may by running and/or associated with the additional objects that a potential vulnerability exists. Of course, as discussed below, in some embodiments, the system also initiates remediation of one or more of the vulnerabilities.

The next step, as represented by block 230, is initiating remediation of at least one or the two or more vulnerabilities with regard to the one or more objects based at least in part on the correlated real-time vulnerability and the one or more exposure tiers into which the correlated real-time vulnerability is classified. As discussed above, the system initiates remediation, in various embodiments, by communicating instructions to one or more systems, workstations, or servers to remediate the vulnerability or vulnerabilities. In some embodiments, the system communicates instructions to an associate of the enterprise, the instructions providing manual directions for the associate to remediate the one or more vulnerabilities.

The next step, as represented by block 240, is initiating remediation of at least one of the two or more vulnerabilities with regard to the one or more additional objects based at least in part on the correlated real-time vulnerability and the one or more exposure tiers into which the correlated real-time vulnerability is classified. This step, of course, is very similar to step 230, however, the difference is that the system in step 240 is initiating remediation of the vulnerabilities with regard to the additional objects. Thus, in some embodiments, the system determines or identifies multiple vulnerabilities corresponding with multiple objects, which may be associated with multiple lines of business.

Referring now to FIG. 3, another method 300 for real-time threat monitoring according to embodiments of the present invention is shown. The first step, as represented by block 310, is applying an exposure methodology to log data thereby identifying one or more security events. The log data, in various embodiments, is contained in one or more object logs related to one or more objects of the enterprise. Step 310 in some embodiments includes applying controls to the log data as discussed in further detail below. A security event, as used herein, may refer to a vulnerability, multiple vulnerabilties, a realized vulnerability, that is, a vulnerability that is more serious such that the vulnerability has progressed to a real-time, present security threat and/or breach. As used herein, the term vulnerability refers to both unrealized security threats as well as realized, real-time present security threats and/or breaches. Accordingly, the terms "vulnerability" and "security event" are used interchangeably herein.

The log data being analyzed in this step provides sight into the real-time workings of the object at issue. That is, in typical threat monitoring systems, real-time monitoring is difficult or impossible because of the complexities associated therewith. However, using object log monitoring, that is, continuous monitoring of the goings-on regarding the objects of an enterprise, the system of the present invention can provide vision into the real-time security of the objects.

The next step, as represented by block 320, is applying an exposure tiering model to the one or more security events, thereby classifying the one or more security events into one or more of a plurality of exposure tiers. As mentioned above, and as discussed further below, embodiments of the exposure tiering model are discussed below in greater detail with reference to FIG. 7. In some embodiments, for example, the exposure tiering model includes multiple tiers into which the security events are classified, which provide context for the severity of the threats associated with the security events, and thereby, indicate the type of alert, and perhaps remediation, that is necessary with regard to the security event.

The next step, as represented by block 330, is initiating an alert based at least in part on the one or more security events and the one or more exposure tiers into which the one or more security events is classified. Similar to step 140 discussed above, step 330 involves the system initiating an alert to associates and/or lines of business and/or systems, workstations and the like within an organization associated with the objects for which the system has identified vulnerabilities.

The next step, as represented by block 340, is initiating remediation of one or more of the security events based at least in part on the correlated log data and the one or more exposure tiers into which the correlated log data is classified. In some embodiments of the method, step 340 is not included, but rather, the method ends with initiating an alert or multiple alerts. In some such embodiments, the associates and/or lines of business that receive alerts are left to determine the appropriate remediation action without further initiation by the system of the present invention.

In some embodiments, however, the alert(s) and the remediation information are included in one and the same communication. For example, in some embodiments, the system initiates one or more alerts to a line of business indicating the presence of a correlated real-time vulnerability or security event and concurrently communicates instructions either for manual and/or automation remediation of the vulnerabilities or security events.

Referring now to FIG. 4, a method 400 including additional detail regarding step 310 of FIG. 3 is shown. Step 310, as originally presented in FIG. 3, applies an exposure methodology to log data thereby identifying one or more security events. In some embodiments, step 310 includes, as represented by block 410A, correlating two or more portions of the log data, each corresponding to at least one of the security events. In some embodiments, as represented by block 410B, step 310 includes applying one or more controls to the log data in order to identify one or more security events. The next step in some such embodiments, as represented by block 420, is analyzing one or more outputs from the one or more controls applied to the log data in order to identify one or more security events.

In some embodiments, step 310 includes identifying the highest exposure objects within the enterprise. For example, in various embodiments, objects, such as applications within the enterprise have increased exposure to insider and/or outsider attacks because of particular characteristics of the applications. For example, in some instances, applications have increased exposure because they are associated and/or have access to confidential materials such as non-public information. In another example, the object may have access to the enterprise's databases or may be an enterprise database storing sensitive information. In yet another example, the object, either application or system or database, may be connected with other system within the enterprise storing or having access to sensitive data. In some instances, such objects, because of their characteristics and susceptibility to particular security events, pose high exposure for adverse business impact and/or have incomplete or non-existent mitigating controls for identifying and/or remediating threats such as real time vulnerabilities.

In some embodiments, step 310 is used to identify not only the security events of concern, but also to determine particular characteristics regarding the security events of concern so that they may be classified based on the exposure tiering model (see step 320 discussed above). For example, in one embodiment, applying the exposure methodology includes assigning a risk rating to, for example, applications of an enterprise. In this example applications containing overdue critical findings, such as identified vulnerabilities that have not been successfully remediated, or repeat offenders, such as applications repeatedly identified as having real-time vulnerabilities are given higher exposure ratings. Further, applications both containing overdue critical findings and repeat offenders are given even higher ratings. In some embodiments of the exposure tiering model, these exposure ratings are used to classify the objects into the various tiers. In other embodiments of the exposure tiering model, these exposure ratings and considerations such as other exposure scores are used during the alerting and remediation steps. That is, information regarding the exposure rating is used, in conjunction with the tier in which the object and/or security event is classified in order to determine the urgency of the alert being initiated and the content of the instructions being communicated during remediation initiation.

Referring now to FIG. 5, a method 500 including additional detail regarding step 420 of FIG. 4 is shown. Step 420, as originally presented in FIG. 4, includes analyzing one or more outputs from the one or more controls applied to the log data in order to identify one or more security events. In some embodiments, step 420 includes, as represented by block 510A, correlating two or more outputs from the controls to identify one or more security events. In some embodiments, step 420 includes, as represented by block 510B, correlating two or more portions of log data based at least in part on one or more outputs from the one or more controls applied to the log data in order to identify one or more security events.

Referring now to FIG. 6, a block diagram illustrates an environment 600 in which the system and the various methods of the present invention operate according to embodiments of the present invention. An enterprise system 601 is a computer system, server, multiple computer systems and/or servers or the like. The enterprise system 601, in the embodiments shown has a communication device 612 communicably coupled with a processing device 614, which is also communicably coupled with a memory device 616. The processing device is configured to control the communication device 612 such that the enterprise system 601 communicates across the network 602 with one or more other systems. The processing device is also configured to access the memory device 616 in order to read the computer readable instructions 618, which in some embodiments includes an object log monitoring application 609 and/or a tiered exposure model application 611. In some embodiments, the object log monitoring application 609 and the tiered exposure model application 611 are the same application, and in other embodiments, they are separate applications. In some embodiments, the object log monitoring application 609 and/or the tiered exposure model application 611 are stored and/or run on multiple systems, such as multiple servers, and in other embodiments, portions of the applications are stored and/or run on multiple systems such as servers. The memory device 616 also has a datastore 619 or database for storing pieces of data for access by the object log monitoring application and/or the tiered exposure model application 611 and the processing device 614.

The object log monitoring application 609 is configured for instructing the processing device 614 to perform various steps of the methods discussed herein, such as, but not limited to, steps 110, 120, 130, 140, 150, 210, 220, 230, 240, 310, 320, 330, 340, 410A, 410B, 420, 510A, and/or 510B, and/or other steps and/or similar steps. Furthermore, in some embodiments, the tiered exposure model application 611, which is separate from the object log monitoring application 609 in some embodiments, is configured for instructing the processing device 614 to perform various steps of the methods discussed herein, such as, but not limited to, steps 130 and/or 320 and/or other steps and/or similar steps.

In various embodiments, the object log monitoring application 609 and/or the tiered exposure model application 611 are included in the computer readable instructions stored in a memory device of one or more systems other than the financial institution system 601. For example, in some embodiments, the object log monitoring application 609 and/or the tiered exposure model application 611 are stored and configured for being accessed by a processing device of a user system 604 and/or a line of business system 608 or some other system, either inside or outside the enterprise.

A user system 604 is configured for use by a user 606 such as an administrator of the tiered exposure model and application log monitoring system or an associate of the enterprise. The user system 604 is a computer system, server, multiple computer system, multiple servers, a mobile device or some other computing device configured for use by a user. The user system 604 has a communication device 622 communicatively coupled with a processing device 624, which is also communicatively coupled with a memory device 626. The processing device 624 is configured to control the communication device 622 such that the user system 604 communicates across the network 602 with one or more other systems. The processing device 624 is also configured to access the memory device 626 in order to read the computer readable instructions 628, which in some embodiments include a web browser application 620 as well as an alerting and/or remediation application 621. The memory device 626 also has a datastore 629 or database for storing pieces of data for access by the processing device 624. The web browser application 620 is configured to provide the user 606 a user interface for navigating the Internet, and, in some embodiments, is configured to provide the user an interface for accessing the enterprise system 601, such as, for example, when the administrator and/or associate is inputting information regarding a new object and defining correlation rules and searching rules regarding the new object. As another example, in one embodiment, the user is a financial institution associate and is accessing the enterprise system 601 remotely in order to review one or more object logs and the real-time vulnerabilities associated with the objects and/or to check whether there have been any new alerts and/or remediation initiated by the enterprise system 601 with regard to the associate's line of business. In such an embodiment, the web browser application 620 is configured to communicate and work in conjunction with the object log monitoring application 609 and/or the tiered exposure model application 611 such that the financial institution associate has access to necessary system functionality.

The line of business system 608 is configured for receiving communications from the enterprise system 601 such as, for example communications regarding alerts and/or remediation of real-time vulnerabilities or security events. In another example, in various embodiments, one or more line or business systems 608 store and provide access to other information, such as information regarding particular objects associated with the line of business and/or information regarding controls, correlation rules, searching rules and other information used by the application log monitoring application 609 and/or the tiered exposure model application 611 when performing the methods disclosed herein.

In some embodiments, the line of business system 608 includes a communication device 632 communicatively coupled with a processing device 634, which is also communicatively coupled with a memory device 636. The processing device 634 is configured to control the communication device 632 such that the third party system 608 communicates across the network 602 with one or more other systems. The processing device 634 is also configured to access the memory device 636 in order to read the computer readable instructions 638, which in some embodiments include instructions for communicating with the enterprise system 601, and in some embodiments, includes some or all of the object log monitoring application 609 and/or the tiered exposure model application 611 and/or an alerting and/or remediation application 640.

In some embodiments, the alerting and/or remediation application 640 is configured for receiving one or more alerts initiated by the enterprise system based upon the method discussed herein. The alerting and/or remediation application 640 is configured, in some embodiments, to alert either the line of business system and/or one or more associates of the line of business of the vulnerability or security event. In some embodiments, the alerting and/or remediation application 640 is configured for receiving instructions regarding a vulnerability, such as the classified tier of the vulnerability and the alerting and/or remediation application then produces the alert based on the information received. In other embodiments, the communication received from the enterprise system includes specific instructions regarding the alert and/or remediation and the application 640 follows those specific instructions.

In various embodiments, one of the systems discussed above, such as the enterprise system 601, is more than one system and the various components of the system are not collocated, and in various embodiments, there are multiple components performing the functions indicated herein as a single device. For example, in one embodiment, multiple processing devices perform the functions of the processing device 614 of the enterprise system 601 described herein.

Referring now to FIG. 7, a diagram of an exposure tiering model according to embodiments of the present invention is shown. The lefthand side of the diagram shows those vulnerabilties and/or security events that are classified as a clear and present danger. Those vulnerabilities and/or security events are classified in Tier 1, which in some embodiments, is considered a fraud tier. In the embodiment shown, Tier 1 includes those objects, such as applications, servers, databases and the like of the enterprise that are associated with non-public information (NPI) having vulnerabilities and/or security events originating external to the enterprise. Thus, the vulnerabilities or security events that correspond with those criteria, in this embodiment are classified in Tier 1. Tier 2 is considered the regulatory tier and includes those vulnerabilities and/or security events that, in the embodiment shown, are associated with objects, such as applications, servers, databases and the like of the enterprise that are associated with no NPI having vulnerabilities and/or security events originating external to the enterprise. In Tier 3, those objects that are associated with NPI having vulnerabilities and/or security events originating internal to the enterprise are classified. The vulnerabilities and/or security events associated with those objects are also classified in Tier 3. Tier 3, in this embodiment is termed the insider threat tier, and Tier 4, in this embodiment, is termed the service disruption tier. Tier 4 includes those objects that are associated with no NPI having vulnerabilities and/or security events originating internal to the enterprise. The vulnerabilities and/or security events that are associated with the Tier 4 objects are also classified as Tier 4. As shown in FIG. 7, the potential volume of action, that is, the potential resources necessary for remediation of the Tier 4 vulnerabilities, for example, is possibly much greater than the Tier 1 vulnerabilities. Further, the priority of action, that is, the urgency for remediation of vulnerabilities associated with the lower tiers, such as Tier 1, is much greater. Hence, vulnerabilities classified in Tier 1 are considered clear and present dangers in some embodiments. In various other embodiments, different numbers of tiers are included in the exposure tiering model as well as different criteria used to classify the objects and their associated, identified, and correlated vulnerabilities.

Embodiments of the invention provide for systems, methods and computer program products for real-time threat monitoring. In some embodiments, a method includes identifying two or more real time vulnerabilities, each associated with one or more objects of an enterprise, correlating the two or more real-time vulnerabilities to each other, applying an exposure tiering model to the correlated real-time vulnerability, thereby classifying the correlated real-time vulnerability into exposure tiers, and initiating an alert based on the correlated real-time vulnerability and the exposure tiers into which the correlated real-time vulnerability is classified. According to other embodiments a method includes applying an exposure methodology to log data contained in one or more object logs thereby identifying one or more security events, applying an exposure tiering model to the one or more security events, thereby classifying the security events into exposure tiers, and initiating an alert based on the security events and the exposure tiers into which the security events are classified.

Although some embodiments of the invention described herein are generally described as involving an "enterprise," one of ordinary skill in the art will appreciate that the invention may be utilized by many different types of organizations and/or businesses that take the place of or work in conjunction with the enterprise to perform one or more of the processes or steps described herein as being performed by an enterprise. In some embodiments, the enterprise is or includes a financial institution such as, for example, a bank.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor/processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A method for real-time threat monitoring, the method comprising:
identifying, by a processing device, two or more real time vulnerabilities, each associated with one or more objects of an enterprise;
correlating, by the processing device, the two or more real-time vulnerabilities to each other, thereby resulting in a correlated real-time vulnerability;
applying, by the processing device, an exposure tiering model to the correlated real-time vulnerability, thereby classifying the correlated real-time vulnerability into one or more of a plurality of exposure tiers based at least in part on whether the correlated real-time vulnerability is associated with exposure of non-public information and whether the correlated real-time vulnerability is associated with exposure originating external to the enterprise,
wherein the exposure tiering model comprises a first tier having a first priority of action, a second tier having a second priority of action, a third tier having a third priority of action and a fourth tier having a fourth tier having a fourth priority of action, wherein:
the correlated real-time vulnerability is applied to the first tier if it is associated with non-public information and is associated with exposure originating external to the enterprise;
the correlated real-time vulnerability is applied to the second tier if it is not associated with non-public information and is associated with exposure originating external to the enterprise;
the correlated real-time vulnerability is applied to the third tier if it is associated with non-public information and is not associated with exposure originating external to the enterprise;
the correlated real-time vulnerability is applied to the fourth tier if it is not associated with non-public information and is not associated with exposure originating external to the enterprise; and
the first priority of action is greater than each of the second priority of action, the third priority of action and the fourth priority of action; and the method further comprising:
initiating, by the processing device, an alert based at least in part on the correlated real-time vulnerability and the one or more exposure tiers into which the correlated real-time vulnerability is classified.

2. The method of claim 1, wherein the one or more objects of the enterprise comprise one or more applications of the enterprise.

3. The method of claim 1, wherein the one or more objects of the enterprise comprise one or more computing systems of the enterprise.

4. The method of claim 3, wherein the one or more computing systems comprise one or more servers.

5. The method of claim 1, wherein the one or more objects of the enterprise comprise one or more databases of the enterprise.

6. The method of claim 1, further comprising:
initiating, by the processing device, remediation of at least one of the two or more vulnerabilities based at least in part on the correlated real-time vulnerability and the one or more exposure tiers into which the correlated real-time vulnerability is classified.

7. The method of claim 1, further comprising:
determining, by the processing device, one or more additional objects of the enterprise corresponding with the correlated real-time vulnerability; and
initiating, by the processing device, one or more additional alerts based at least in part on the correlated real-time vulnerability and the one or more exposure tiers into which the correlated real-time vulnerability is classified.

8. The method of claim 7, further comprising:
initiating, by the processing device, remediation of at least one of the two or more vulnerabilities with regard to the one or more objects based at least in part on the correlated real-time vulnerability and the one or more exposure tiers into which the correlated real-time vulnerability is classified.

9. The method of claim 7, further comprising:
initiating, by the processing device, remediation of at least one of the two or more vulnerabilities with regard to the one or more additional objects based at least in part on the correlated real-time vulnerability and the one or more exposure tiers into which the correlated real-time vulnerability is classified.

10. A system for real-time threat monitoring, the system comprising:
a processing device configured for:
identifying two or more real time vulnerabilities, each associated with one or more objects of an enterprise;
correlating the two or more real-time vulnerabilities to each other, thereby resulting in a correlated real-time vulnerability;
applying an exposure tiering model to the correlated real-time vulnerability, thereby classifying the correlated real-time vulnerability into one or more of a plurality of exposure tiers based at least in part on whether the correlated real-time vulnerability is associated with exposure of non-public information and whether the correlated real-time vulnerability is associated with exposure originating external to the enterprise,
wherein the exposure tiering model comprises a first tier having a first priority of action, a second tier having a second priority of action, a third tier having a third priority of action and a fourth tier having a fourth tier having a fourth priority of action, wherein:
the correlated real-time vulnerability is applied to the first tier if it is associated with non-public information and is associated with exposure originating external to the enterprise;
the correlated real-time vulnerability is applied to the second tier if it is not associated with non-public information and is associated with exposure originating external to the enterprise;
the correlated real-time vulnerability is applied to the third tier if it is associated with non-public information and is not associated with exposure originating external to the enterprise;
the correlated real-time vulnerability is applied to the fourth tier if it is not associated with non-public information and is not associated with exposure originating external to the enterprise; and
the first priority of action is greater than each of the second priority of action, the third priority of action and the fourth priority of action; and wherein the processing device is further configured for:
initiating an alert based at least in part on the correlated real-time vulnerability and the one or more exposure tiers into which the correlated real-time vulnerability is classified.

11. The system of claim 10, wherein the one or more objects of the enterprise comprise one or more applications of the enterprise.

12. The system of claim 10, wherein the one or more objects of the enterprise comprise one or more computing systems of the enterprise.

13. The system of claim 12, wherein the one or more computing systems comprise one or more servers.

14. The system of claim 10, wherein the one or more objects of the enterprise comprise one or more databases of the enterprise.

15. The system of claim 10, wherein the processing device is further configured for: initiating remediation of at least one of the two or more vulnerabilities based at least in part on the correlated real-time vulnerability and the one or more exposure tiers into which the correlated real-time vulnerability is classified.

16. The system of claim 10, wherein the processing device is further configured for: determining one or more additional objects of the enterprise corresponding with the correlated real-time vulnerability; and
initiating one or more additional alerts based at least in part on the correlated real-time vulnerability and the one or more exposure tiers into which the correlated real-time vulnerability is classified.

17. The system of claim 16, wherein the processing device is further configured for: initiating remediation of at least one of the two or more vulnerabilities with regard to the one or more objects based at least in part on the correlated real-time vulnerability and the one or more exposure tiers into which the correlated real-time vulnerability is classified.

18. The system of claim 16, wherein the processing device is further configured for: initiating remediation of at least one of the two or more vulnerabilities with regard to the one or more additional objects based at least in part on the correlated real-time vulnerability and the one or more exposure tiers into which the correlated real-time vulnerability is classified.

19. A computer program product comprising a non-transitory computer-readable memory comprising computer-readable instructions for real-time threat monitoring, the instructions comprising:
instructions for identifying two or more real time vulnerabilities, each associated with one or more objects of an enterprise;
instructions for correlating the two or more real-time vulnerabilities to each other, thereby resulting in a correlated real-time vulnerability;
instructions for applying a exposure tiering model to the correlated real-time vulnerability, thereby classifying the correlated real-time vulnerability into one or more of a plurality of exposure tiers based at least in part on whether the correlated real-time vulnerability is associated with exposure of non-public information and whether the correlated real-time vulnerability is associated with exposure originating external to the enterprise,
wherein the exposure tiering model comprises a first tier having a first priority of action, a second tier having a second priority of action, a third tier having a third priority of action and a fourth tier having a fourth tier having a fourth priority of action, wherein:
the correlated real-time vulnerability is applied to the first tier if it is associated with non-public information and is associated with exposure originating external to the enterprise;
the correlated real-time vulnerability is applied to the second tier if it is not associated with non-public information and is associated with exposure originating external to the enterprise;
the correlated real-time vulnerability is applied to the third tier if it is associated with non-public information and is not associated with exposure originating external to the enterprise;
the correlated real-time vulnerability is applied to the fourth tier if it is not associated with non-public information and is not associated with exposure originating external to the enterprise; and the first priority of action is greater than the second priority of action, the third priority of action and the fourth priority of action; and the instructions further comprising:

instructions for initiating an alert based at least in part on the correlated real-time vulnerability and the one or more exposure tiers into which the correlated real-time vulnerability is classified.

20. The computer program product of claim 19, wherein the one or more objects of the enterprise comprise one or more applications of the enterprise.

21. The computer program product of claim 19, wherein the one or more objects of the enterprise comprise one or more computing systems of the enterprise.

22. The computer program product of claim 21, wherein the one or more computing systems comprise one or more servers.

23. The computer program product of claim 19, wherein the one or more objects of the enterprise comprise one or more databases of the enterprise.

24. The computer program product of claim 19, wherein the instructions further comprise: instructions for initiating remediation of at least one of the two or more vulnerabilities based at least in part on the correlated real-time vulnerability and the one or more exposure tiers into which the correlated real-time vulnerability is classified.

25. The computer program product of claim 19, wherein the instructions further comprise: instructions for determining one or more additional objects of the enterprise corresponding with the correlated real-time vulnerability; and instructions for initiating one or more additional alerts based at least in part on the correlated real-time vulnerability and the one or more exposure tiers into which the correlated real-time vulnerability is classified.

26. The computer program product of claim 25, wherein the instructions further comprise:

instructions for initiating remediation of at least one of the two or more vulnerabilities with regard to the one or more objects based at least in part on the correlated real-time vulnerability and the one or more exposure tiers into which the correlated real-time vulnerability is classified.

27. The computer program product of claim 25, wherein the instructions further comprise: instructions for initiating remediation of at least one of the two or more vulnerabilities with regard to the one or more additional objects based at least in part on the correlated real-time vulnerability and the one or more exposure tiers into which the correlated real-time vulnerability is classified.

28. A method for real-time threat monitoring, the method comprising:

applying, by a processing device, an exposure methodology to log data thereby identifying one or more security events, the log data contained in one or more object logs;

applying, by the processing device, an exposure tiering model to the one or more security events, thereby classifying the one or more security events into one or more of a plurality of exposure tiers based at least in part on whether the correlated real-time vulnerability is associated with exposure of non-public information and whether the correlated real-time vulnerability is associated with exposure originating external to the enterprise, wherein the exposure tiering model comprises a first tier having a first priority of action, a second tier having a second priority of action, a third tier having a third priority of action and a fourth tier having a fourth tier having a fourth priority of action, wherein:

the correlated real-time vulnerability is applied to the first tier if it is associated with non-public information and is associated with exposure originating external to the enterprise;

the correlated real-time vulnerability is applied to the second tier if it is not associated with non-public information and is associated with exposure originating external to the enterprise;

the correlated real-time vulnerability is applied to the third tier if it is associated with non-public information and is not associated with exposure originating external to the enterprise;

the correlated real-time vulnerability is applied to the fourth tier if it is not associated with non-public information and is not associated with exposure originating external to the enterprise; and the first priority of action is greater than the second priority of action, the third priority of action and the fourth priority of action; and the method further comprising:

initiating, by the processing device, an alert based at least in part on the one or more security events and the one or more exposure tiers into which the one or more security events is classified.

29. The method of claim 28, wherein applying a risk methodology to log data thereby identifying one or more security events comprises: correlating, by the processing device, two or more portions of the log data each corresponding to at least one of the security events.

30. The method of claim 28, wherein applying a risk methodology to log data thereby identifying one or more security events comprises: applying, by the processing device, one or more controls to the log data.

31. The method of claim 30, wherein applying an exposure methodology to log data thereby identifying one or more security events further comprises:

analyzing, by the processing device, one or more outputs from the one or more controls applied to the log data in order to identify one or more security events.

32. The method of claim 31, wherein analyzing comprises:

correlating, by the processing device, two or more outputs from the controls to identify one or more security events.

33. The method of claim 31, wherein analyzing comprises:

correlating, by the processing device, two or more portions of log data based at least in part on the one or more outputs from the one or more controls applied to the log data, the correlating to identify one or more security events.

34. The method of claim 28, wherein the one or more object logs comprise one or more application logs corresponding to one or more applications of an enterprise.

35. The method of claim 28, wherein the one or more object logs comprise one or more computing system logs of an enterprise.

36. The method of claim 28, wherein the one or more object logs comprise one or more databases of an enterprise.

37. The method of claim 28, further comprising:

initiating, by the processing device, remediation of one or more of the security events based at least in part on the correlated log data and the one or more exposure tiers into which the correlated log data is classified.

38. A system for real-time threat monitoring, the system comprising a processing device configured for:

applying an exposure methodology to log data thereby identifying one or more security events, the log data contained in one or more object logs;

applying an exposure tiering model to the one or more security events, thereby classifying the one or more security events into one or more of a plurality of exposure tiers based at least in part on whether the correlated real-time vulnerability is associated with exposure of non-public information and whether the correlated real-time vulnerability is associated with exposure originating external to the enterprise, wherein the exposure tiering model comprises a first tier having a first priority of action, a second tier having a second priority of action, a third tier having a third priority of action and a fourth tier having a fourth tier having a fourth priority of action, wherein:

the correlated real-time vulnerability is applied to the first tier if it is associated with non-public information and is associated with exposure originating external to the enterprise;

the correlated real-time vulnerability is applied to the second tier if it is not associated with non-public information and is associated with exposure originating external to the enterprise;

the correlated real-time vulnerability is applied to the third tier if it is associated with non-public information and is not associated with exposure originating external to the enterprise;

the correlated real-time vulnerability is applied to the fourth tier if it is not associated with non-public information and is not associated with exposure originating external to the enterprise; and the first priority of action is greater than the second priority of action, the third priority of action and the fourth priority of action; and the processing device further configured for:

initiating an alert based at least in part on the one or more security events and the one or more exposure tiers into which the one or more security events is classified.

39. The system of claim 38, wherein the processing device is configured for applying an exposure methodology to log data thereby identifying one or more security events comprising:

correlating two or more portions of the log data each corresponding to at least one of the security events.

40. The system of claim 38, wherein the processing device is configured for applying an exposure methodology to log data thereby identifying one or more security events comprising: applying one or more controls to the log data.

41. The system of claim 40, wherein the processing device is configured for applying an exposure methodology to log data thereby identifying one or more security events further comprising: analyzing one or more outputs from the one or more controls applied to the log data in order to identify one or more security events.

42. The system of claim 41, wherein the processing device is configured for analyzing comprising: correlating two or more outputs from the controls to identify one or more security events.

43. The system of claim 41, wherein the processing device is configured for analyzing comprising:

correlating two or more portions of log data based at least in part on the one or more outputs from the one or more controls applied to the log data, the correlating to identify one or more security events.

44. The system of claim 38, wherein the one or more object logs comprise one or more application logs corresponding to one or more applications of an enterprise.

45. The system of claim 38, wherein the one or more object logs comprise one or more computing system logs of an enterprise.

46. The system of claim 38, wherein the one or more object logs comprise one or more databases of an enterprise.

47. The system of claim 38, wherein the processing device is further configured for initiating remediation of one or more of the security events based at least in part on the correlated log data and the one or more exposure tiers into which the correlated log data is classified.

48. A computer program product comprising a non-transient computer-readable memory comprising computer-readable instructions for real-time threat monitoring, the instructions comprising:

instructions for applying an exposure methodology to log data thereby identifying one or more security events, the log data contained in one or more object logs;

instructions for applying an exposure tiering model to the one or more security events, thereby classifying the one or more security events into one or more of a plurality of exposure tiers based at least in part on whether the correlated real-time vulnerability is associated with exposure of non-public information and whether the correlated real-time vulnerability is associated with exposure originating external to the enterprise, wherein the exposure tiering model comprises a first tier having a first priority of action, a second tier having a second priority of action, a third tier having a third priority of action and a fourth tier having a fourth tier having a fourth priority of action, wherein:

the correlated real-time vulnerability is applied to the first tier if it is associated with non-public information and is associated with exposure originating external to the enterprise;

the correlated real-time vulnerability is applied to the second tier if it is not associated with non-public information and is associated with exposure originating external to the enterprise;

the correlated real-time vulnerability is applied to the third tier if it is associated with non-public information and is not associated with exposure originating external to the enterprise;

the correlated real-time vulnerability is applied to the fourth tier if it is not associated with non-public information and is not associated with exposure originating external to the enterprise; and the first priority of action is greater than the second priority of action, the third priority of action and the fourth priority of action; and the instructions further comprising:

instructions for initiating an alert based at least in part on the one or more security events and the one or more exposure tiers into which the one or more security events is classified.

49. The computer program product of claim 48, wherein the instructions for applying an exposure risk methodology to log data thereby identifying one or more security events comprise:

instructions for correlating two or more portions of the log data each corresponding to at least one of the security events.

50. The computer program product of claim 48, wherein the instructions for applying an exposure methodology to log data thereby identifying one or more security events comprise: instructions for applying one or more controls to the log data.

51. The computer program product of claim 50, wherein the instructions for applying an exposure methodology to log data thereby identifying one or more security events further comprise: instructions for analyzing one or more outputs from the one or more controls applied to the log data in order to identify one or more security events.

52. The computer program product of claim 51, wherein the instructions for analyzing comprise:
    instructions for correlating two or more outputs from the controls to identify one or more security events.

53. The computer program product of claim 51, wherein the instructions for analyzing comprise:
    instructions for correlating two or more portions of log data based at least in part on the one or more outputs from the one or more controls applied to the log data, the correlating to identify one or more security events.

54. The computer program product of claim 48, wherein the one or more object logs comprise one or more application logs corresponding to one or more applications of an enterprise.

55. The computer program product of claim 48, wherein the one or more object logs comprise one or more computing system logs of an enterprise.

56. The computer program product of claim 48, wherein the one or more object logs comprise one or more databases of an enterprise.

57. The computer program product of claim 48, wherein the instructions further comprise:
    instructions for initiating remediation of one or more of the security events based at least in part on the correlated log data and the one or more exposure tiers into which the correlated log data is classified.

* * * * *